United States Patent
Hasegawa et al.

(10) Patent No.: US 7,920,719 B2
(45) Date of Patent: Apr. 5, 2011

(54) COLLISION AVOIDANCE OF A MOBILE UNIT

(75) Inventors: Yuji Hasegawa, Saitama (JP); Jiro Okuma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 968 days.

(21) Appl. No.: 11/810,432

(22) Filed: Jun. 5, 2007

(65) Prior Publication Data

US 2008/0033649 A1   Feb. 7, 2008

(30) Foreign Application Priority Data

Jun. 5, 2006   (JP) ................................ 2006-156396

(51) Int. Cl.
*G06K 9/00* (2006.01)
*G05B 23/02* (2006.01)
*G08G 1/16* (2006.01)

(52) U.S. Cl. ........ 382/103; 340/3.41; 340/903; 701/301

(58) Field of Classification Search ................. 382/103, 382/104, 107; 340/903, 3.41, 436; 348/169–172, 348/118, 120, 837; 701/301; 296/35.2
See application file for complete search history.

(56) References Cited

U.S. PATENT DOCUMENTS

| 6,233,008 | B1 * | 5/2001 | Chun ........................... 348/170 |
| 6,691,034 | B1 * | 2/2004 | Patera et al. .................. 701/301 |
| 7,102,495 | B2 * | 9/2006 | Mattes et al. ................. 340/435 |
| 7,117,090 | B2 * | 10/2006 | Haider .......................... 701/301 |
| 7,298,394 | B2 * | 11/2007 | Kamijo et al. ................ 348/149 |

FOREIGN PATENT DOCUMENTS

| JP | 11-134504 | 5/1999 |
| JP | 2003-051016 | 2/2003 |

* cited by examiner

*Primary Examiner* — Abolfazl Tabatabai
(74) *Attorney, Agent, or Firm* — Nelson Mullins Riley & Scarborough LLP; Anthony A. Laurentano, Esq.

(57) ABSTRACT

A collision avoidance system for a mobile unit includes an image capturing unit for capturing an image of an environment surrounding a mobile unit. Motion vector is calculated based on the captured image. Collision probability is calculated based on the motion vectors of the image. The system includes a plurality of receptive field units that are modeled on the optic lobe cells of the flies. Each of the receptive field units includes a filter producing an excitatory response to the motion vector diverging from the center of the receptive field in the central area of the receptive field and producing an inhibitory response to the motion vector converging toward the center of the receptive field in the areas around the central area. The outputs of the receptive field units are compared to determine a direction in which the obstacle approaches the mobile unit. The mobile unit moves in a direction to avoid collision.

15 Claims, 7 Drawing Sheets

(a)

(b)

(c)

COLLISION AVOIDANCE OF A MOBILE UNIT

BACKGROUND OF THE INVENTION

1. Field of the Invention

The present invention relates to a collision avoidance system, program, and method of a mobile unit for avoiding collision with an obstacle, and more particularly, to a collision avoidance system, program, and method of a mobile unit which estimates a collision probability and an approaching direction of an obstacle using a plurality of motion detectors which are modeled on the optic lobe neurons of flies.

2. Description of the Related Art

Collision avoidance against an obstacle is a function necessary for a mobile unit to arrive at a destination safely. Many techniques for avoiding collision with an obstacle have been proposed, which are based on optical flows extracted from visual information such as camera image.

For example, Japanese Patent Application Publication No. 11-134504 discloses a device which detects collision with an obstacle based on a value obtained by subtracting a vector sum of optical flows in a direction converging to a given point from a vector sum of optical flows in a direction diverging from the same point. A neural network is used for calculating the difference between the vector sum in diverging direction and the vector sum in converging direction.

In addition, Japanese Patent Application Publication No. 2003-51016 discloses a system in which vector sums of optical flows in two different areas in an image are calculated respectively using spatial filters such as Gaussian filters, and an approaching obstacle is detected based on the difference between these vector sums.

With respect to avoidance behavior of a living body responsive to visual information, a living body performs wide variety of rapid and proper avoidance behaviors responsive to complex external environments in the real world. Also in a collision avoidance technique of a mobile unit, it is desirable that optimal behavior is selected according to the direction in which an obstacle is approaching the mobile unit or the like. However, a technique for detecting a direction in which an obstacle is approaching has not been presented by conventional techniques such as in the above documents.

The present invention provides a collision avoidance technique for a mobile unit which allows avoidance of collision with an obstacle by detecting a direction in which the obstacle approaches the mobile unit based on visual information. A behavior is selected according to the approaching direction of the obstacle.

SUMMARY OF THE INVENTION

The present invention provides a collision avoidance system for a mobile unit for avoiding collision with an obstacle that approaches the mobile unit. This system includes image capturing means for capturing an image of an environment surrounding the mobile unit, means for calculating motion vectors of the image based on the image captured by the image capturing means, means for calculating collision probabilities of the obstacle based on the motion vectors on a plurality of pixels in the image, and means for comparing the collision probabilities on the plurality of pixels to determine a direction in which the obstacle approaches the mobile unit. The mobile unit is moved in a direction different from the determined approaching direction.

According to this invention, a direction in which an obstacle approaches a mobile unit can be determined based on a collision probability calculated on a plurality of pixels in an image, so that an optimal behavior can be selected to avoid collision with the obstacle.

According to one embodiment of the present invention, the motion vector calculating means calculates a temporal correlation relative to light and dark of two different pixels on the image. The correlation value is treated as a motion vector.

In one embodiment of the present invention, the obstacle collision probability calculating means uses a filter which produces an excitatory response in the central area responsive to the motion vector diverging from the center and which produces an inhibitory response in the area around the central area responsive to the motion vector converging toward the center. The calculating means calculates the collision probabilities by adding a value reflecting the magnitude of the motion vector.

In one embodiment of the present invention, when one of the collision probabilities exceeds a predetermined threshold value, the status determination means determines a direction in which the obstacle approaches the mobile unit based on magnitudes of the collision probabilities in a plurality of pixels, and moves the mobile unit in a direction which is selected responsive to the determined direction.

In addition, the present invention provides a computer program for avoiding collision with an obstacle that approaches a mobile unit. This program causes a computer to perform capturing an image of an environment surrounding the mobile unit, calculating motion vectors on the image based on the image captured by the image capturing function, a function of calculating collision probabilities of the obstacle based on the motion vectors in a plurality of pixels in the image, and comparing the collision probabilities in the plurality of pixels to determine a direction in which the obstacle approaches the mobile unit. The mobile unit is moved in a direction different from the determined direction.

Further, the present invention provides a method for avoiding collision with an obstacle that approaches a mobile unit. This method includes the steps of capturing an image of an environment surrounding the mobile unit, calculating motion vectors on the image based on the image captured by the image capturing step, calculating collision probabilities of the obstacle based on the motion vectors in a plurality of pixels in the image, and comparing the collision probabilities on the plurality of pixels to determine a direction in which the obstacle approaches the mobile unit. The mobile unit is moved in a direction different from the determined direction.

DETAILED DESCRIPTION OF THE PREFERRED EMBODIMENTS

Figure 1:
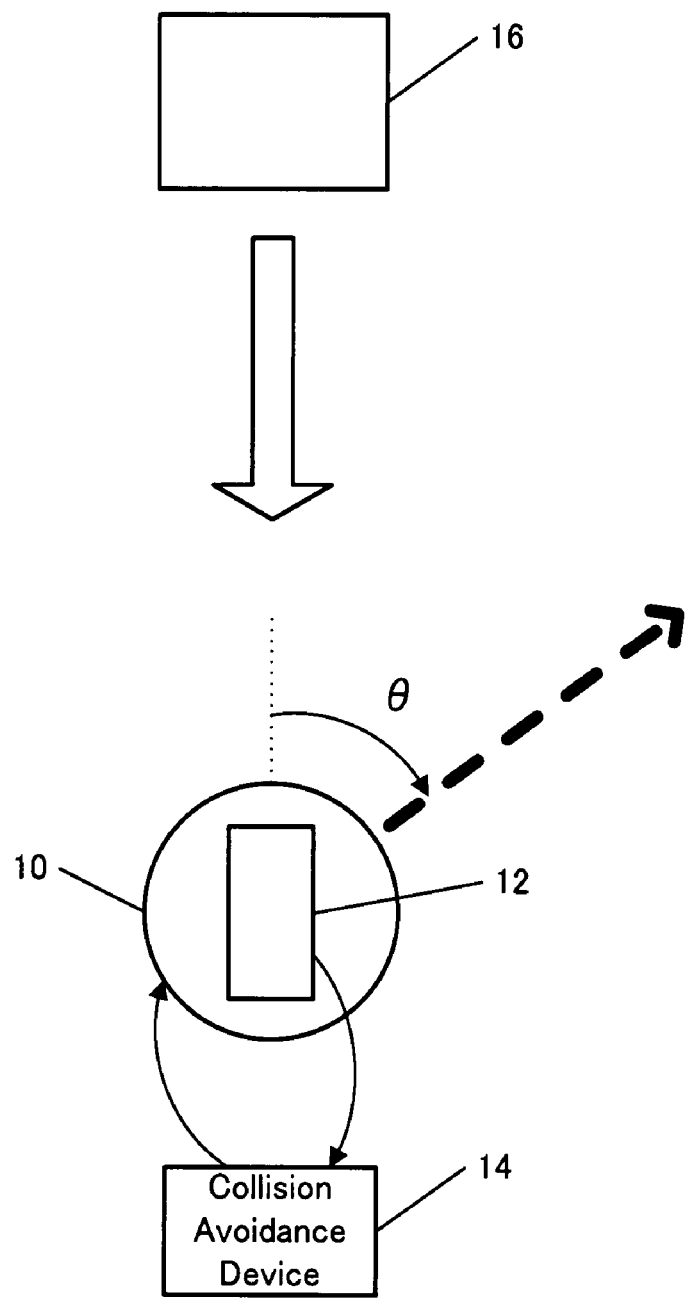
FIG. 1 is a schematic diagram which shows a collision avoidance system of a mobile unit according to one embodiment of the present invention.

Embodiments of the present invention will be described with reference to the drawings. FIG. 1 is a schematic diagram which illustrates a collision avoidance system of a mobile unit 10 according to one embodiment of the present invention.

In the present embodiment, the mobile unit 10 is a small autonomous mobile robot with two wheels, for example, Khepera Robot™ which is highly versatile and widely used as a small mobile robot for experiment. The mobile unit 10 is provided with image capturing means such as a CCD camera 12 on the main body, and recognizes an obstacle 16 around the mobile unit 10 based on an image captured by the CCD camera 12. The image captured by the CCD camera 12 is transmitted to a collision avoidance device 14 connected via a wired or wireless connection to the mobile unit 10.

The collision avoidance device 14 analyzes the image received from the mobile unit 10 to determine a direction in which the obstacle 16 is approaching the mobile unit 10 and to determine a collision probability. When the collision avoidance device 14 determines that the obstacle 16 is highly likely to collide with the mobile unit 10, the collision avoidance device 14 provides the mobile unit 10 with a move instruction to avoid collision with the obstacle 16 according to the approaching direction of the obstacle 16. For example, as illustrated in FIG. 1, if the obstacle 16 is approaching the mobile unit 10 from front of the unit ($\theta=0$), the move instruction is selected to move the mobile unit 10 to the forward right diagonally as indicated by the dotted arrow. The collision avoidance device 14 may be provided inside the mobile unit 10.

Figure 2:
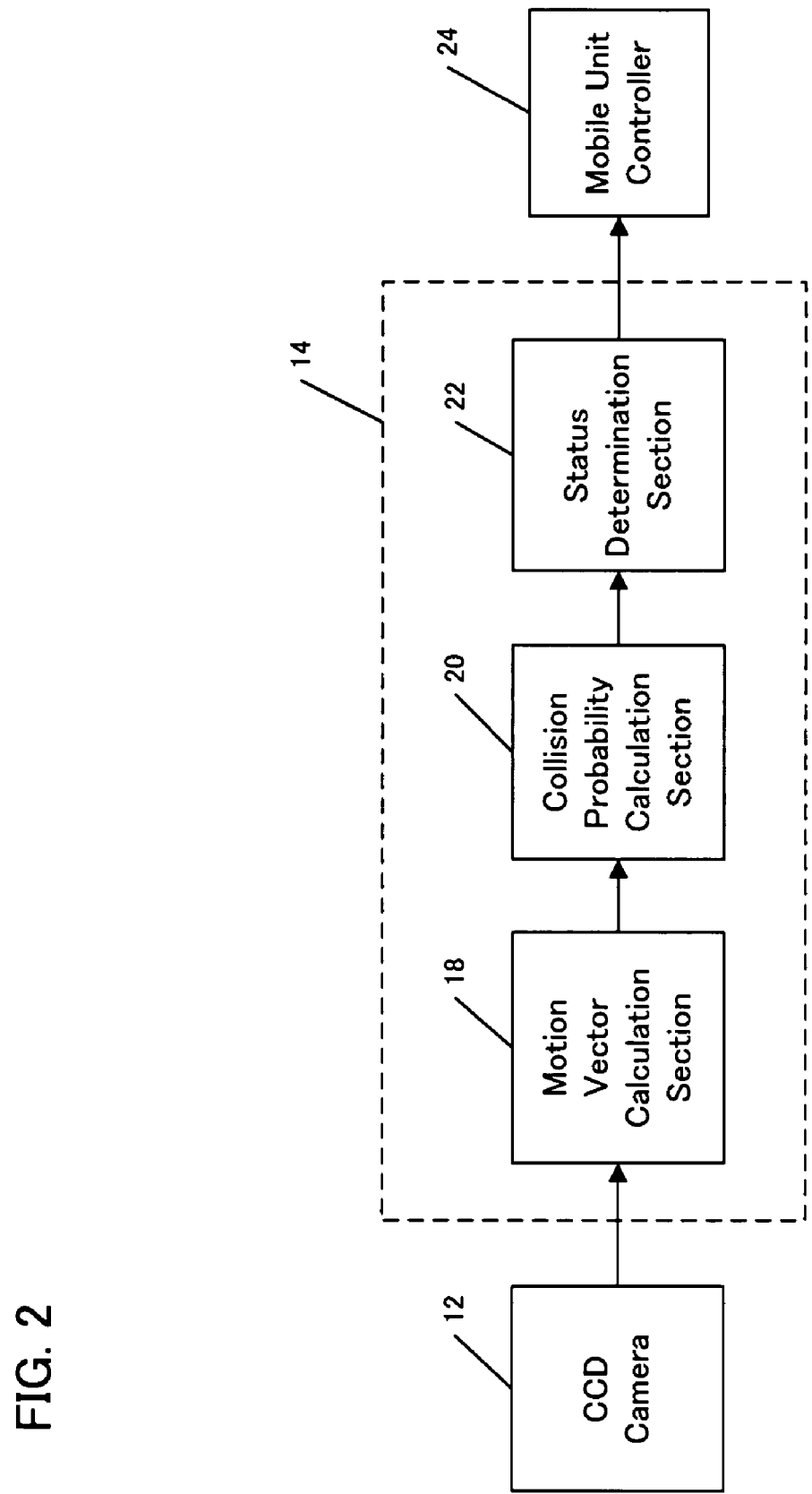
FIG. 2 is a functional block diagram of the collision avoidance system of the mobile unit according to the embodiment.

FIG. 2 is a functional block diagram of the collision avoidance system of the mobile unit 10 according to one embodiment. The collision avoidance system includes the CCD camera 12 and a mobile unit controller 24 which are provided in the mobile unit 10, and the collision avoidance device 14. The collision avoidance device 14 includes a motion vector calculation section 18, a collision probability calculation section 20, and a status determination section 22.

Basic operation of the collision avoidance system of the mobile unit 10 will be described below.

The CCD camera 12 mounted on the mobile unit 10 captures an image of an environment surrounding the mobile unit 10. The motion vector calculation section 18 analyzes the image captured by the CCD camera 12 to calculate a "motion vector" which represents motion direction of each pixel in the image. The collision avoidance calculation section 20 calculates "collision probabilities" on a plurality of pixels in the image using a collision avoidance model created based on optic lobe neurons of flies. The "collision probability" is an indicator of probabilities that the obstacle 16 collides with the mobile unit 10. The status determination section 22 determines whether or not the obstacle 16 collides with the mobile unit 10 based on the calculated collision probabilities, and compares the collision probabilities in the plurality of pixels to determine a direction $\theta$ to which the mobile unit 10 should move. Then, the mobile unit controller 24 moves the mobile unit 10 to the direction $\theta$ to avoid collision with the obstacle 16.

Figure 3:
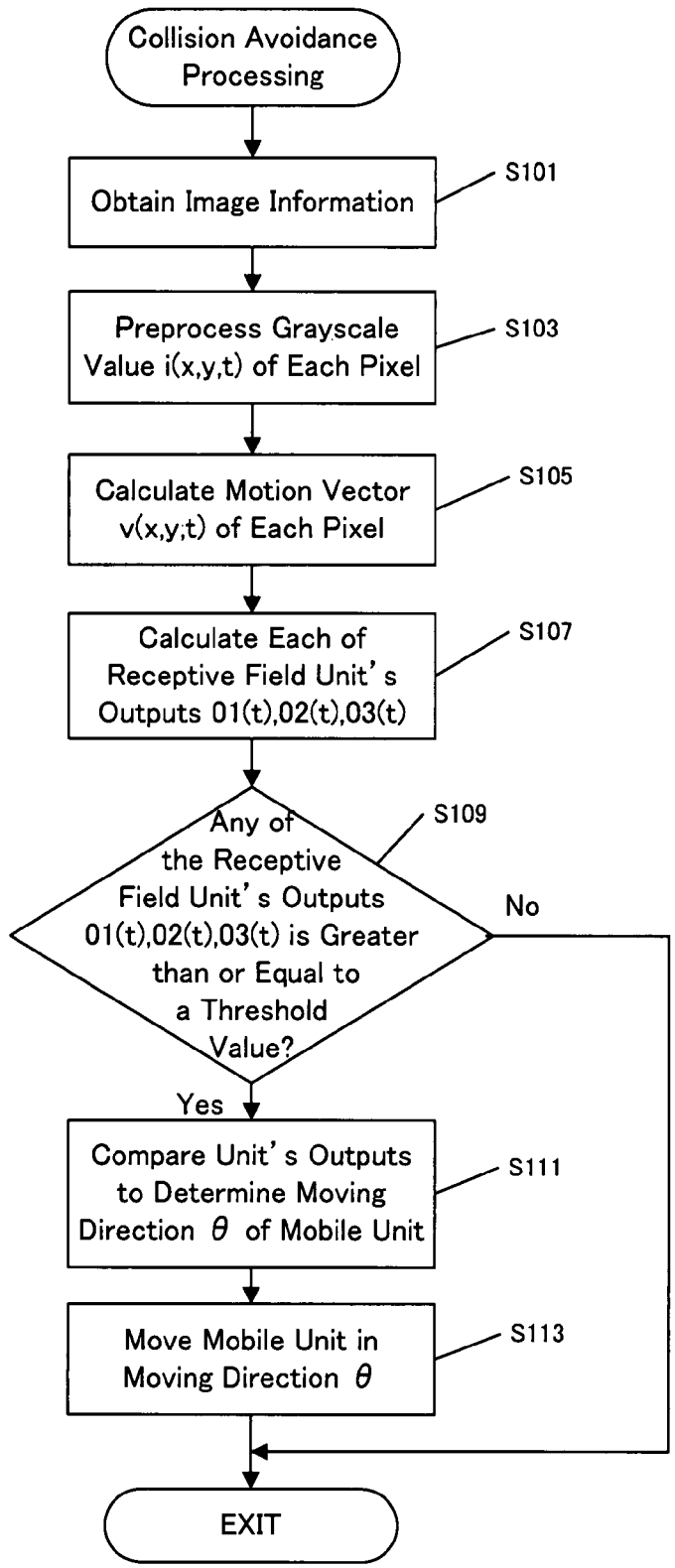
FIG. 3 is a flowchart which shows collision avoidance processing of the mobile unit.

Collision avoidance processing of the mobile unit 10 according to the present embodiment will next be described with reference to FIG. 3. FIG. 3 is a flowchart which shows the collision avoidance processing of the mobile unit 10.

Figure 4:
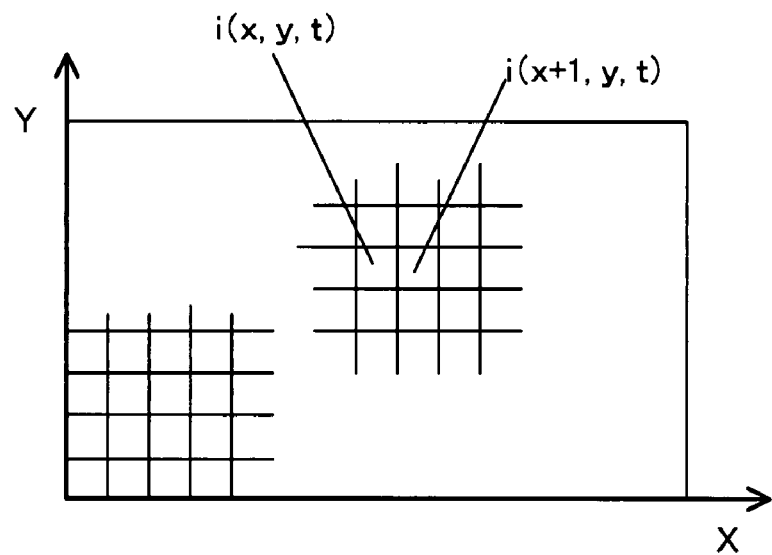
FIG. 4 is a conceptual diagram of image information obtained from a CCD camera.

In step S101, the motion vector calculation section 18 obtains an image from the CCD camera 12. In the present embodiment, the image is sampled at 10 Hz by the CCD camera 12, and transmitted to the motion vector calculation section 18. An image captured by the CCD camera 12 is a 640×480 pixel image, and each pixel in the image has a grayscale value from 0 to 255. A two-dimensional coordinate system in which the horizontal axis is x-axis and the vertical axis is y-axis in the image is set as shown in FIG. 4, and a grayscale value of a pixel at coordinates (x, y) at time t is expressed as i(x, y, t).

In step S103, the motion vector calculation section 18 preprocesses a grayscale value i(x, y, t) of each pixel in the image. In the present embodiment, a grayscale value i(x, y, t) of each pixel is smoothed with a Gaussian filter. When a grayscale value of a pixel at any coordinates $(x_k, y_l)$ on the image at time t is expressed as $i(x_k, y_l, t)$, a Gaussian filter output I(x, y, t) at coordinates (x, y) is given by the following equation:

$$I(x, y, t) = \sum_k \sum_l i(x_k, y_l, t) e^{\sqrt{\frac{(x_k-x)^2+(y_l-y)^2}{2\sigma^2}}} \quad (1)$$

where $\sigma$ is a constant which defines a spatial expanse of the filter.

Figure 5:
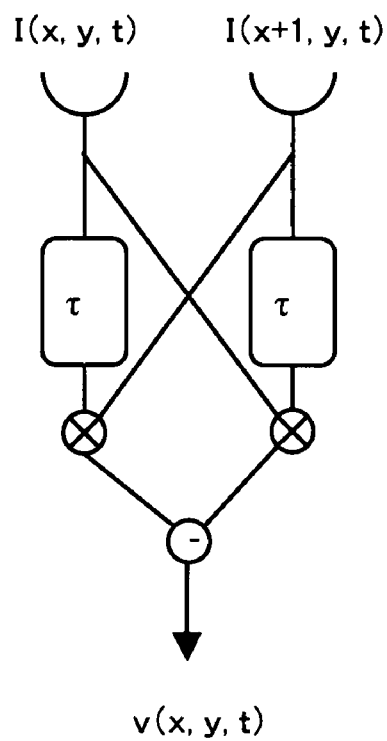
FIG. 5 is a block diagram of EMD which is applied in a motion vector calculation section.

In step S105, the motion vector calculation section 18 calculates a motion vector of each pixel of the image. In the present embodiment, EMD (Elementary Movement Detector) which has been proposed as a model of an optical motion detector of flies is applied as a technique for calculating a motion vector. The EMD is configured as shown in FIG. 5, and detects a motion by calculating a temporal correlation between receptors.

In the present embodiment, Gaussian filter's output values I(x, y, t) and I(x+1, y, t) on pixels adjacent to each other in the x-axis direction are inputted to two receptors of the EMD, respectively.

Then, time delay components I'(x, y, t) and I'(x+1, y, t) of time constant $\tau$ are calculated by the following equations:

$$I'(x, y, t) = I'(x, y, t-1) - \frac{1}{\tau}(I'(x, y, t-1) - I(x, y, t)) \quad (2)$$

$$I'(x+1, y, t) = I'(x+1, y, t-1) - \frac{1}{\tau}(I'(x+1, y, t-1) - I(x+1, y, t)) \quad (3)$$

Then, a space-time correlation value v(x, y, t) between the receptors is calculated by the following equation:

$$v(x,y,t) = I(x,y,t)I'(x+1,y,t) - I(x+1,y,t)I'(x,y,t) \quad (4)$$

The correlation value v(x, y, t) calculated by the equation (4) is a positive value when an object in the image moves from coordinates (x, y) to (x+1, y) (moves to the right in FIG. 4), and is a negative value when an object in the image moves from coordinates (x+1, y) to (x, y) (moves to the left in FIG. 4). The correlation value v(x, y, t) is defined as a "motion vector" of the pixel (x, y).

A technique for calculating a motion vector v(x, y, t) may be any technique that can extract information about a motion direction on a per-pixel basis from an image, and may be a conventional technique such as an optical flow technique.

Returning to FIG. 3, in step S107, the collision probability calculation section 20 calculates "collision probabilities" at a plurality of locations of the image based on motion vectors calculated by the motion vector calculation section 16. The "collision probability" as used herein is an indicator of a probability that the obstacle 16 relatively approaches and collides with the mobile unit 10. The obstacle 16 is more likely to collide with the mobile unit 10 as the value of "collision probability" increases. In the present embodiment, as a technique for calculating a collision probability, a collision avoidance model is modeled on the optic lobe cells of the flies having compound eyes.

Figure 6:
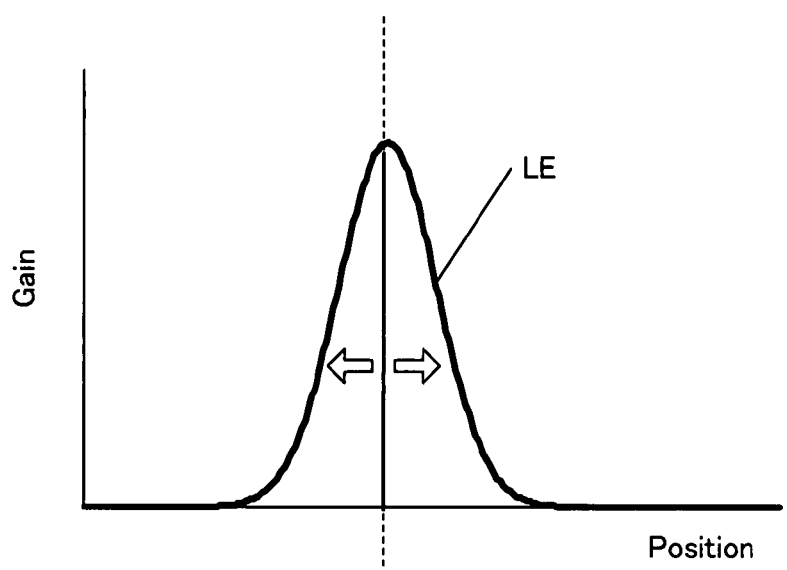
FIG. 6 is a diagram which shows characteristics of a receptive field unit constituting a collision avoidance model applied in a collision probability calculation section.
Figure 6:
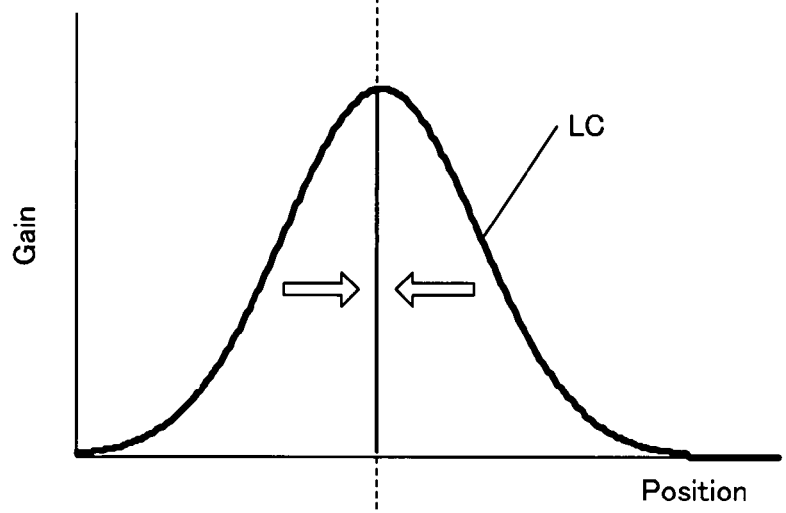
Figure 6:
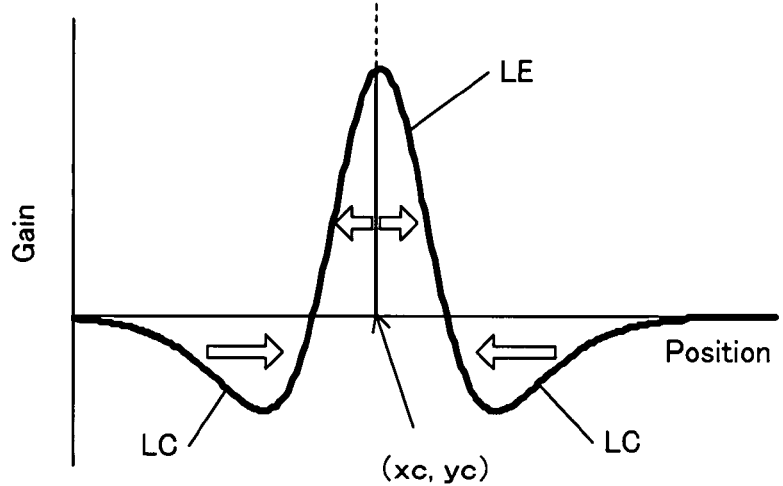
Figure 7:
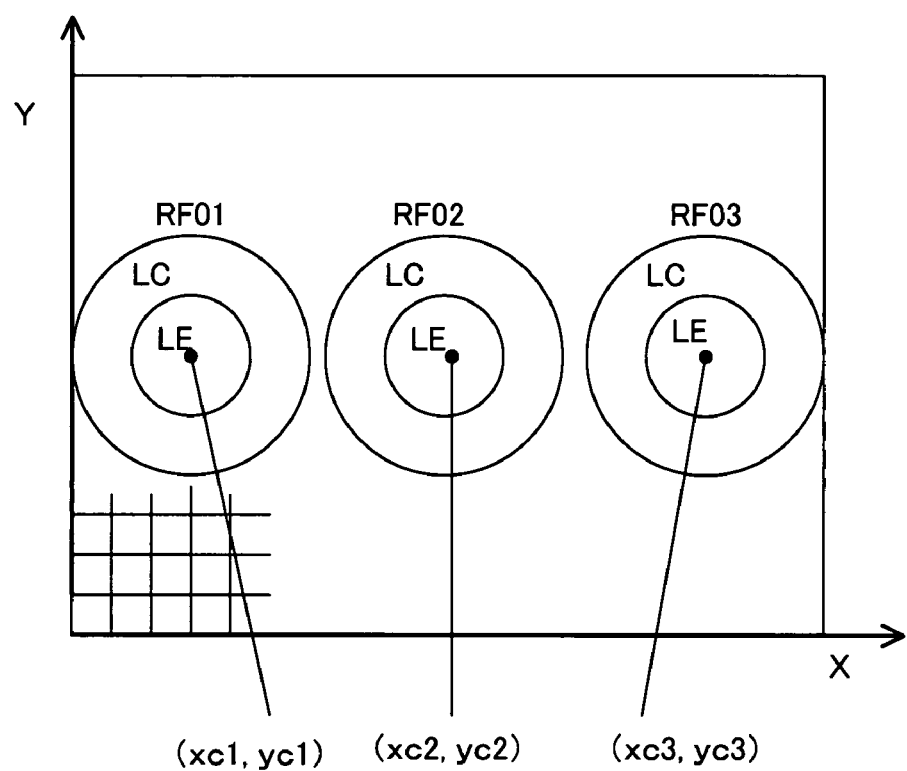
FIG. 7 is a schematic diagram of the collision avoidance model applied in the collision probability calculation section.

As shown in FIG. 7, the collision avoidance model applies a plurality of receptive field units to an image, and calculates collision probabilities with the centers of the receptive fields being pixels (xc1, yc1), xc2, yc2), and xc3, yc3) respectively. The receptive field unit comprises a Mexican hat shaped filter as shown in FIG. 6C. It produces an excitatory response in the vicinity of the center of the filter (an area indicated by LE in FIG. 7), and produces an inhibitory response in an area apart from the center (an area indicated by LC in FIG. 7).

In the present embodiment, the receptive field unit is implemented by combining two Gaussian filters having different variances. The receptive field unit includes a Gaussian filter F(t) which gives a response to motion in diverging direction and a Gaussian filter C(t) which gives a response to motion in converging direction.

When a pixel is at the center coordinate $(x_c, y_c)$ of a receptive field unit, input Ve(x, y, t) to the Gaussian filter F(t) is obtained according to the motion vector v(x, y, t) and the coordinate of the pixel, as expressed by the equation:

$$v_e(x, y, t) = \begin{cases} v(x, y, t) & \text{if } x > x_c, v(x, y, t) > 0 \\ -v(x, y, t) & \text{if } x < x_c, v(x, y, t) < 0 \\ 0 & \text{otherwise} \end{cases} \quad (5)$$

Output of the Gaussian filter F(t) with the center $(x_c, y_c)$ is calculated by the following equation:

$$F(t) = \sum_k \sum_l v_e(x_k, y_l, t) e^{\sqrt{\frac{(x_k - x_c)^2 + (y_l - y_c)^2}{2\sigma_e^2}}} \quad (6)$$

where σe is a constant which defines a spatial expanse in integrating motion vectors.

In the Gaussian filter F(t) of the equation (6), gain by which input Ve(x, y, t) is multiplied is determined according to the distance from the center $(x_c, y_c)$. For example, the gain of the Gaussian filter of the equation (6) may have a value as shown in FIG. 6A according to the distance from the center $(x_c, y_c)$.

Then, input Vc(x, y, t) to the Gaussian filter C(t) is obtained by the following equation according to the motion vector v(x, y, t) and the coordinate of the pixel:

$$v_c(x, y, t) = \begin{cases} -v(x, y, t) & \text{if } x > x_c, v(x, y, t) < 0 \\ v(x, y, t) & \text{if } x < x_c, v(x, y, t) > 0 \\ 0 & \text{otherwise} \end{cases} \quad (7)$$

Output of the Gaussian filter C(t) with the center $(x_c, y_c)$ is calculated by the following equation:

$$C(t) = \sum_k \sum_l v_c(x_k, y_l, t) e^{\sqrt{\frac{(x_k - x_c)^2 + (y_l - y_c)^2}{2\sigma_c^2}}} \quad (8)$$

where σc is constant which defines a spatial expanse in integrating motion vectors.

In the Gaussian filter of the equation (8), gain by which input Vc(x, y, t) is multiplied is determined according to the distance from the center $(x_c, y_c)$. For example, the gain of the Gaussian filter of the equation (8) may have a value as shown in FIG. 6B according to the distance from the center $(x_c, y_c)$.

Finally, a difference between these two filters is calculated to obtain a receptive field unit RF 0(t) as follows:

$$0(t) = F(t) - a \cdot C(t) \quad (9)$$

where a is a constant and satisfies 0<a<1.

The receptive field unit RF 0(t) thus obtained in the present embodiment becomes a Mexican hat shaped filter as shown in FIG. 6C. The receptive field unit RF 0(t) produces an excitatory response in the central area (LE) with the center $(x_c, y_c)$ to a motion vector diverging from the center $(x_c, y_c)$, and produces an inhibitory response in the area surrounding LE (LC) to a motion vector converging toward the center $(x_c, y_c)$.

While receptive field units assumes a Mexican hat shape as shown in FIG. 3C, they may be designed using a technique other than the Gaussian filter.

In the collision avoidance model according to the present embodiment, three receptive field units produced according to the equations (5) to (9) are positioned in parallel to the x-axis direction as shown in FIG. 7. The outputs 01(t), 02(t), and 03(t) of the receptive field units RF 01, RF 02 and RF 03 with the centers at (xc1, yc1), (xc2, yc2), and (xc3, yc3) respectively are calculated. The calculated values are defined as "collision probabilities" at the receptive fields with the centers at (xc1, yc1), (xc2, yc2), and (xc3, yc3) respectively.

Returning to FIG. 3, in step S109, the status determination section 22 determines whether or not any of the outputs 01(t), 02(t), and 03(t) is greater than or equal to a threshold value (for example, 0.02). When any of the outputs 01(t), 02(t), and 03(t) is greater than or equal to the threshold value, it is determined that the obstacle 16 is highly likely to collide with the mobile unit 10, and the processing proceeds to step S111. When all of the outputs 01(t), 02(t), and 03(t) are below the threshold value, it is determined that the obstacle 16 is less likely to collide yet so that avoidance movement is not needed, and the processing is terminated.

In step S111, the status determination section 22 compares the outputs 01(t), 02(t), and 03(t) to determine a direction in which the mobile unit 10 needs to move. The status determination section 22 selects a direction θ in which the mobile unit needs to move to avoid collision with the obstacle, for example, by the following condition. As shown in FIG. 1, θ equals 0 in the front direction, and a clockwise direction from there is a positive direction.

$$\theta = \begin{cases} -45 & \text{if } 01 \leq 02 \text{ and } 01 < 03 \\ 0 & \text{if } 02 \leq 01 \text{ and } 02 < 03 \\ 45 & \text{if } 03 \leq 01 \text{ and } 03 < 02 \\ 180 & \text{otherwise} \end{cases} \quad (10)$$

The condition expression (10) is set such that the receptive field unit whose output value is minimum among the outputs 01(t), 02(t), and 03(t) is selected to give the moving direction θ of the mobile unit 10. Therefore, the mobile unit 10 is moved in a direction in which the mobile unit 10 is least likely to collide with the obstacle 16.

Then, in the step S113, the mobile unit 10 is moved in the angular direction determined in the step S111 to avoid collision with the obstacle 16.

Experimental results of the collision avoidance system according to the present embodiment will be described next with reference to FIG. 8.

Figure 8:
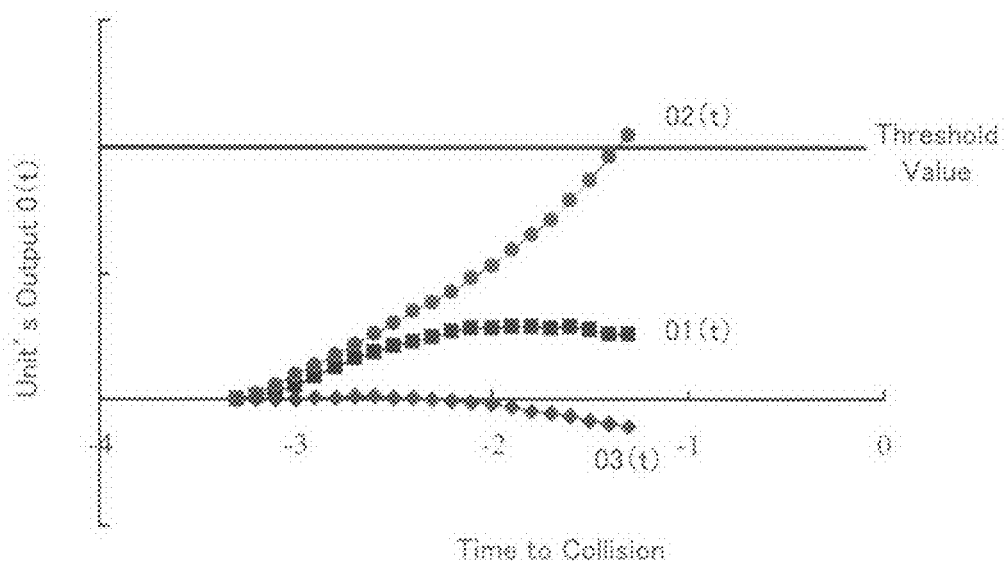
FIG. 8 is a graph which shows progressions of the outputs $01(t)$, $02(t)$, $03(t)$ in the time of the receptive field units as the obstacle approaches the mobile unit from the front ($\theta=0$).

FIG. 8 is a graph which shows progressions of the outputs 01(*t*), 02(*t*), and 03(*t*) in the time as the obstacle 16 approaches the mobile unit 10 from the front (θ=0). The abscissa of the graph represents time to collision, and time 0, time −1, and time −2 indicates the time of collision, one second before the collision, and two seconds before collision respectively. This "time to collision" is derived for verification in advance according to a relative movement speed of the obstacles 16 and a distance from the obstacles 16 to the mobile unit. The ordinate of the graph represents output of a receptive field unit.

With reference to FIG. 8, output 02 of the receptive field unit RF 02 in the center exceeds a threshold value more than one second before the collision. With reference to step S109 of FIG. 3, the status determination section 22 determines that the obstacle 16 is highly likely to collide with the mobile unit 10 at this time point.

A moving direction θ of the mobile unit 10 is determined based on the condition expression (10) described in step S111 of FIG. 3. Because the outputs 0(*t*), 02(*t*), and 03(*t*) are in a condition that 03(*t*)<01(*t*) and 03(*t*)<02(*t*), the status determination section 22 selects the direction of the receptive field unit RF 03 with the output 03(*t*). The mobile unit 10 is least likely to collide with the obstacle 16 in the direction of 45 degrees from the front to the right. The mobile unit 10 moves in the selected direction to avoid the collision with the obstacle 16.

As described above, since probabilities that the obstacle 16 collides with the mobile unit 10 are represented by the outputs 01(*t*), 02(*t*), and 03(*t*) based on a plurality of pixels in an image, and the direction in which an obstacle is approaching the mobile unit is determined based on these plural collision probabilities 01(*t*), 02(*t*), and 03(*t*), the mobile unit 10 can avoid collision with the obstacle 16 by selecting the optimal moving direction θ.

Embodiments of the present invention are not limited to the above described embodiment and can be modified without departing from the spirit of the present invention.

Although the case where the obstacle 16 approaches the mobile unit 10 has been described in the above described embodiments, the collision avoidance technique according to the present invention can also be applied to the case where the mobile unit 10 moves toward a fixed obstacle, and the case where the mobile unit 10 as well as the obstacle 16 move.

Although the small mobile robot is described as a specific example of the mobile unit 10 in the above embodiment, the mobile unit 10 of the present invention is not limited to the small mobile robot, and may be, for example, a bipedal walking robot or an automobile.

What is claimed is:

1. A collision avoidance system for a mobile unit for avoiding collision with an obstacle, the system comprising:
    means for capturing an image of an environment of the mobile unit;
    means for calculating motion vectors relative to the image captured by said image capturing means;
    means for calculating collision probabilities with the obstacle based on the motion vectors on a plurality of pixels in said image; and
    means for comparing the collision probabilities on the plurality of pixels to determine a direction in which said obstacle relatively approaches the mobile unit,
    wherein said means for calculating collision probability comprises a plurality of receptive field units that are modeled on the optic lobe cells of flies.

2. The system according to claim 1, wherein said means for calculating motion vectors calculates a temporal correlation of intensity of two different pixels in said image to determine the motion vector.

3. The system according to claim 1, wherein each of the receptive field units comprises a filter producing an excitatory response to the motion vector diverging from the center of the receptive field in the central area of the receptive field and producing an inhibitory response to the motion vector converging toward the center of the receptive field in the areas around the central area.

4. The system according to claim 3, further comprises means for determining a direction in which said obstacle approaches said mobile unit based on the outputs of the receptive field units when one of the outputs exceeds a predetermined threshold value.

5. The system according to claim 3, further comprises means for determining the direction that mobile unit needs to move to avoid collision with the obstacle based on the outputs of the receptive field units.

6. A non-transitory computer readable recording medium storing a computer program, which, when run on a computer installed in a mobile unit, performs:
    capturing an image of an environment of the mobile unit;
    calculating motion vectors relative to the captured image;
    calculating collision probabilities with the obstacle based on the motion vectors on a plurality of pixels in said image; and
    comparing the collision probabilities on the plurality of pixels to determine a direction in which said obstacle relatively approaches the mobile unit,
    wherein said calculating collision probability includes a plurality of receptive field units that are modeled on the optic lobe cells of flies.

7. The medium according to claim 6, wherein said calculating motion vectors includes calculating a temporal correlation of intensity of two different pixels in said image to determine the motion vector.

8. The medium according to claim 6, wherein each of the receptive field units comprises a filter producing an excitatory response to the motion vector diverging from the center of the receptive field in the central area of the receptive field and producing an inhibitory response to the motion vector converging toward the center of the receptive field in the areas around the central area.

9. The medium according to claim 8, wherein the program further performs determining a direction in which said obstacle approaches said mobile unit based on the outputs of the receptive field units when one of the outputs exceeds a predetermined threshold value.

10. The medium according to claim 8, wherein the program further performs determining the direction that mobile unit needs to move to avoid collision with the obstacle based on the outputs of the receptive field units.

11. A method for avoiding collision with an obstacle approaching a mobile unit, comprising the steps of:
    capturing an image of an environment of the mobile unit;
    calculating motion vectors relative to the captured image;

calculating collision probabilities with the obstacle based on the motion vectors on a plurality of pixels in said image; and comparing the collision probabilities on the plurality of pixels to determine a direction in which said obstacle relatively approaches the mobile unit, wherein said calculating collision probability includes a plurality of receptive field units that are modeled on the optic lobe cells of flies.

12. The method according to claim 11, wherein said calculating motion vectors includes calculating a temporal correlation of intensity of two different pixels in said image to determine the motion vector.

13. The method according to claim 11, wherein each of the receptive field units comprises a filter producing an excitatory response to the motion vector diverging from the center of the receptive field in the central area of the receptive field and producing an inhibitory response to the motion vector converging toward the center of the receptive field in the areas around the central area.

14. The method according to claim 13, wherein the program further performs determining a direction in which said obstacle approaches said mobile unit based on the outputs of the receptive field units when one of the outputs exceeds a predetermined threshold value.

15. The method according to claim 13, wherein the program further performs determining the direction that mobile unit needs to move to avoid collision with the obstacle based on the outputs of the receptive field units.

* * * * *